(12) United States Patent
Jo et al.

(10) Patent No.: US 12,353,220 B2
(45) Date of Patent: Jul. 8, 2025

(54) MOBILE OBJECT AND METHOD OF CONTROLLING THE SAME

(71) Applicants: HYUNDAI MOTOR COMPANY, Seoul (KR); KIA CORPORATION, Seoul (KR); MOBINN INC., Suwon-si (KR)

(72) Inventors: Sun Myoung Jo, Ansan-si (KR); Jin Choi, Seoul (KR); Hoon Chung, Hwaseong-si (KR)

(73) Assignees: HYUNDAI MOTOR COMPANY, Seoul (KR); KIA CORPORATION, Seoul (KR); MOBINN INC., Suwon-si (KR)

( * ) Notice: Subject to any disclaimer, the term of this patent is extended or adjusted under 35 U.S.C. 154(b) by 295 days.

(21) Appl. No.: 17/687,299

(22) Filed: Mar. 4, 2022

(65) Prior Publication Data
US 2023/0004173 A1 Jan. 5, 2023

(30) Foreign Application Priority Data
Jul. 1, 2021 (KR) ........................ 10-2021-0086665

(51) Int. Cl.
| | | |
|---|---|---|
| B25J 5/00 | (2006.01) | |
| B60K 1/04 | (2019.01) | |
| B62D 21/00 | (2006.01) | |
| G05D 1/00 | (2006.01) | |

(52) U.S. Cl.
CPC .............. *G05D 1/0891* (2013.01); *B60K 1/04* (2013.01); *B62D 21/00* (2013.01); *B25J 5/007* (2013.01)

(58) Field of Classification Search
CPC .......... B25J 5/007; B25J 5/005; B25J 9/1694; B62D 57/02; B62D 21/00; G05D 1/0891; B60K 1/04
See application file for complete search history.

(56) References Cited

U.S. PATENT DOCUMENTS

| | | | |
|---|---|---|---|
| 8,155,828 | B2 | 4/2012 | Fuwa et al. |
| 9,020,639 | B2* | 4/2015 | Bewley ..................... B25J 5/005 700/250 |
| 10,611,019 | B2* | 4/2020 | Bewley ..................... B25J 5/007 |
| 2019/0092406 | A1* | 3/2019 | Kossett ................... F41H 7/005 |
| 2021/0116223 | A1* | 4/2021 | Caldwell ................. F42B 27/00 |

FOREIGN PATENT DOCUMENTS

| | | |
|---|---|---|
| JP | H8-026158 A | 1/1996 |
| JP | 2530652 B | 9/1996 |
| JP | 2006-146552 A | 6/2006 |
| JP | 2008-052362 A | 3/2008 |
| KR | 10-1941218 B | 4/2019 |

* cited by examiner

*Primary Examiner* — Gonzalo Laguarda
(74) *Attorney, Agent, or Firm* — MCDONNELL BOEHNEN HULBERT & BERGHOFF LLP (57) ABSTRACT

Disclosed is a mobile object including a body part, a drive part coupled to one side of the body part and including one or more wheels, and an accommodation part coupled to the other side of the body part and having an internal space capable of accommodating an article, in which the drive part is coupled to a lower region of the body part, and the body part is rotatably coupled to the drive part, and in which the accommodation part is coupled to an upper region of the body part, and the accommodation part rotatably coupled to the body part.

9 Claims, 6 Drawing Sheets

MOBILE OBJECT AND METHOD OF CONTROLLING THE SAME

CROSS-REFERENCE TO RELATED APPLICATION

This application claims priority to and the benefit of Korean Patent Application No. 10-2021-0086665 filed in the Korean Intellectual Property Office on Jul. 1, 2021, the entire contents of which are incorporated herein by reference.

FIELD

The present disclosure relates to a mobile object and a method of operating the same, and more particularly, to a mobile object capable of delivering an article, and a method of operating the mobile object.

BACKGROUND

There is an increasing demand for mobility vehicles that can be used for various purposes in addition to the existing vehicles, and thus studies are being actively conducted on unmanned delivery robots.

The unmanned delivery robot encounters various types of obstacles during a process of delivering an article. In particular, when the unmanned delivery robot encounters an obstacle protruding upward from a route, the unmanned delivery robot needs to climb over the obstacle.

However, the unmanned delivery robot in the related art does not include a separate mechanism for overcoming the obstacle. Even in a case in which the unmanned delivery robot in the related art has the mechanism for overcoming the obstacle, there is a problem in that safety of an article being delivered cannot be ensured because the horizontal stability of the unmanned delivery robot deteriorates during a process of overcoming the obstacle.

SUMMARY

The present disclosure has been made in an effort to provide a mobile object that minimizes a separate motion thereof and improves horizontal stability thereof when the mobile object encounters an obstacle on a movement route, thereby ensuring the safety of an article being delivered.

A first exemplary embodiment of the present disclosure provides a mobile object including a body part, a drive part coupled to one side of the body part and including one or more wheels, and an accommodation part coupled to the other side of the body part and having an internal space capable of accommodating an article, in which the drive part is coupled to a lower region of the body part, and the body part is rotatably coupled to the drive part, and in which the accommodation part is coupled to an upper region of the body part, and the accommodation part is rotatably coupled to the body part.

The accommodation part may include a frame including a plurality of rod members fixedly coupled to one another to define the internal space, and a battery fixed to a lower region of the frame.

The battery may be fixed to a bottom surface of the frame.

The body part may include a first region configured to define one side region of the body part and rotatably coupled to the wheel and the frame, and a second region configured to define the other side region of the body part and rotatably coupled to the wheel and the frame.

The first region may include a first frame including a rod member extending in a vertical direction, and a first plate coupled to a lateral side of an upper region of the first frame, and the second region may include a second frame including a rod member extending in the vertical direction, and a second plate coupled to a lateral side of an upper region of the second frame.

The accommodation part may further include a first rotary shaft configured to penetrate the first plate and provided to be rotatable relative to the first plate, and a rotary motor configured to operate the first rotary shaft.

The accommodation part may further include a second rotary shaft configured to penetrate the second plate and provided to be rotatable relative to the second plate.

A second exemplary embodiment of the present disclosure provides a method of controlling the mobile object, the method including a first-1 step in which the drive part is positioned at a front side of the mobile object and faces an obstacle protruding from a ground surface, a first-2 step in which the body part rotates relative to the drive part and the body part tilts forward, a first-3 step in which the accommodation part rotates relative to the body part in a direction in which the accommodation part moves forward, and a first-4 step in which the wheel of the drive part rotates and the mobile object moves forward.

The wheel of the drive part may come into contact with the obstacle, and in which in the first-3 step, the accommodation part may rotate relative to the body part so that a center of gravity of the mobile object is positioned forward from a region in which the wheel is in contact with the obstacle.

In the first-3 step, the accommodation part may rotate relative to the body part so that the accommodation part is perpendicular to a gravitational direction.

A third exemplary embodiment of the present disclosure provides a method of controlling the mobile object, the method including a second-1 step in which the drive part is positioned at a front side of the mobile object and faces an obstacle protruding from a ground surface, a second-2 step in which the body part rotates relative to the drive part and the body part tilts forward, a second-3 step in which the wheel of the drive part rotates and the mobile object moves forward, and a second-4 step in which the accommodation part rotates relative to the body part in a direction in which the accommodation part moves rearward which is opposite to the forward direction.

The method may further include a second-5 step in which the accommodation part rotates relative to the body part in a direction in which the accommodation part moves forward after the second-4 step.

In the second-5 step, the accommodation part may rotate relative to the body part so that the accommodation part is perpendicular to a gravitational direction.

A fourth exemplary embodiment of the present disclosure provides a method of controlling the mobile object, the method including an acceleration step of accelerating the mobile object, in which in the acceleration step, i) a rotational speed of the wheel of the drive part is increased, and ii) the accommodation part rotates relative to the body part in a direction in which the mobile object moves.

A fifth exemplary embodiment of the present disclosure provides a method of controlling the mobile object, the method including a deceleration step of decelerating the mobile object, in which in the deceleration step, i) a rotational speed of the wheel of the drive part is decreased, and ii) the accommodation part rotates relative to the body part in a direction opposite to a direction in which the mobile object moves.

According to the present disclosure, it is possible to provide a mobile object that minimizes a separate motion thereof and improves horizontal stability thereof when the mobile object encounters an obstacle on the movement route, thereby ensuring the safety of an article being delivered.

DETAILED DESCRIPTION

Figure 1:
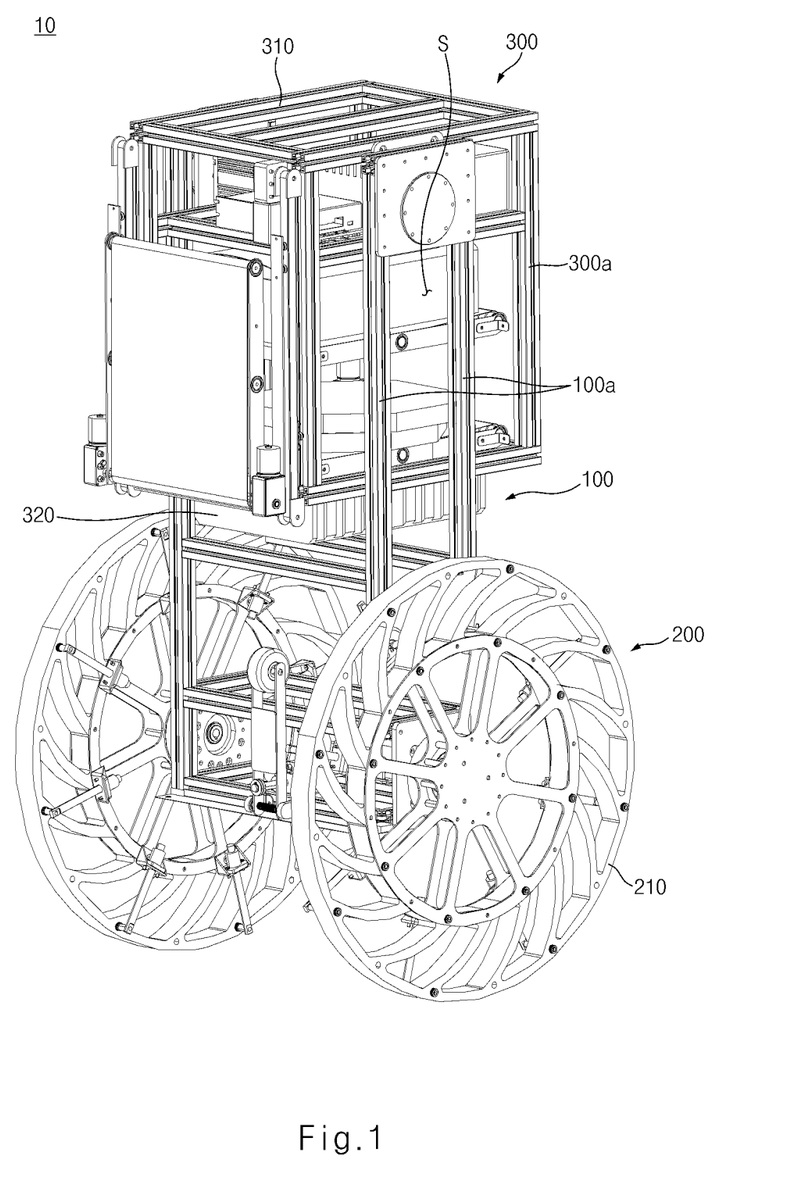
FIG. 1 is a perspective view illustrating a structure of a mobile object according to the present disclosure.
Figure 2:
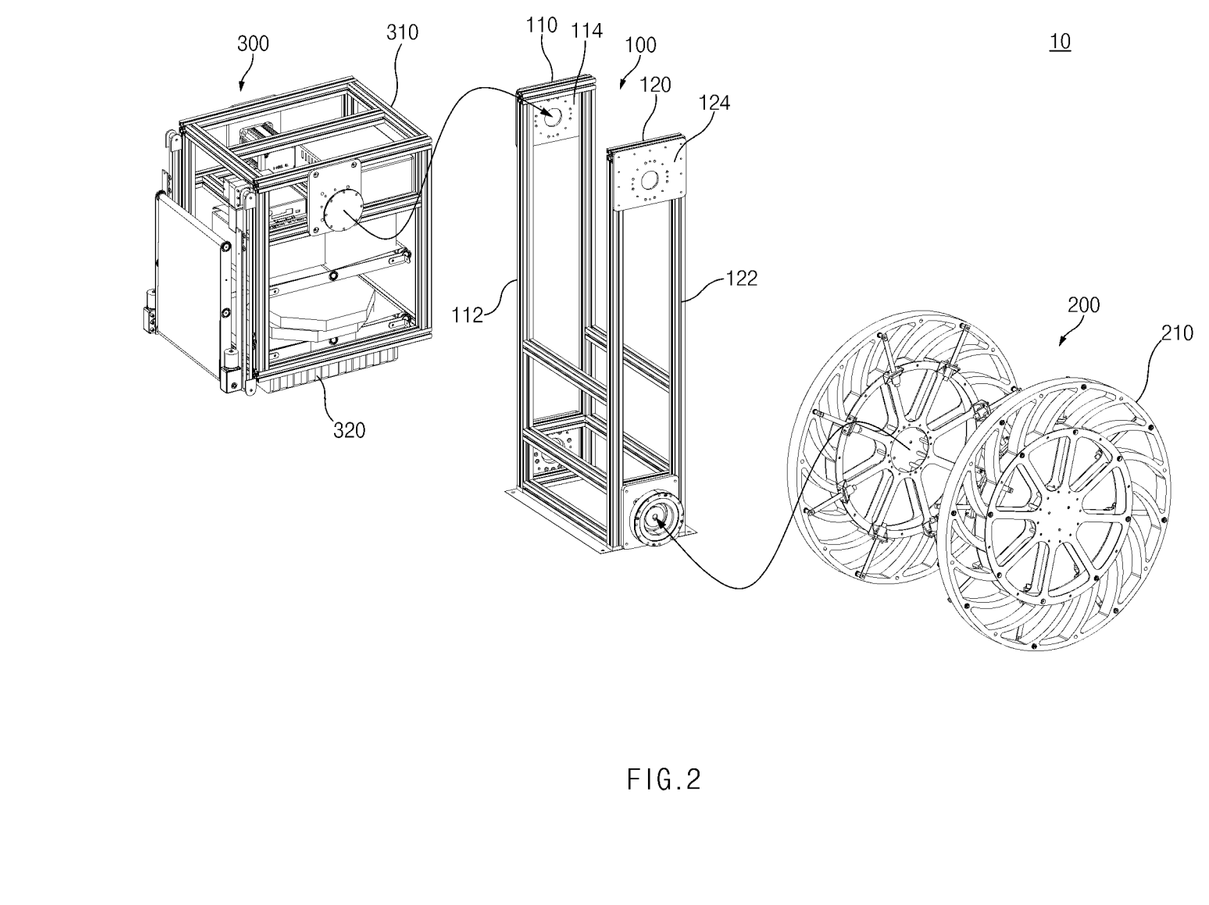
FIG. 2 is an exploded perspective view illustrating a body part, a drive part, and an accommodation part of the mobile object according to the present disclosure.
Figure 3:
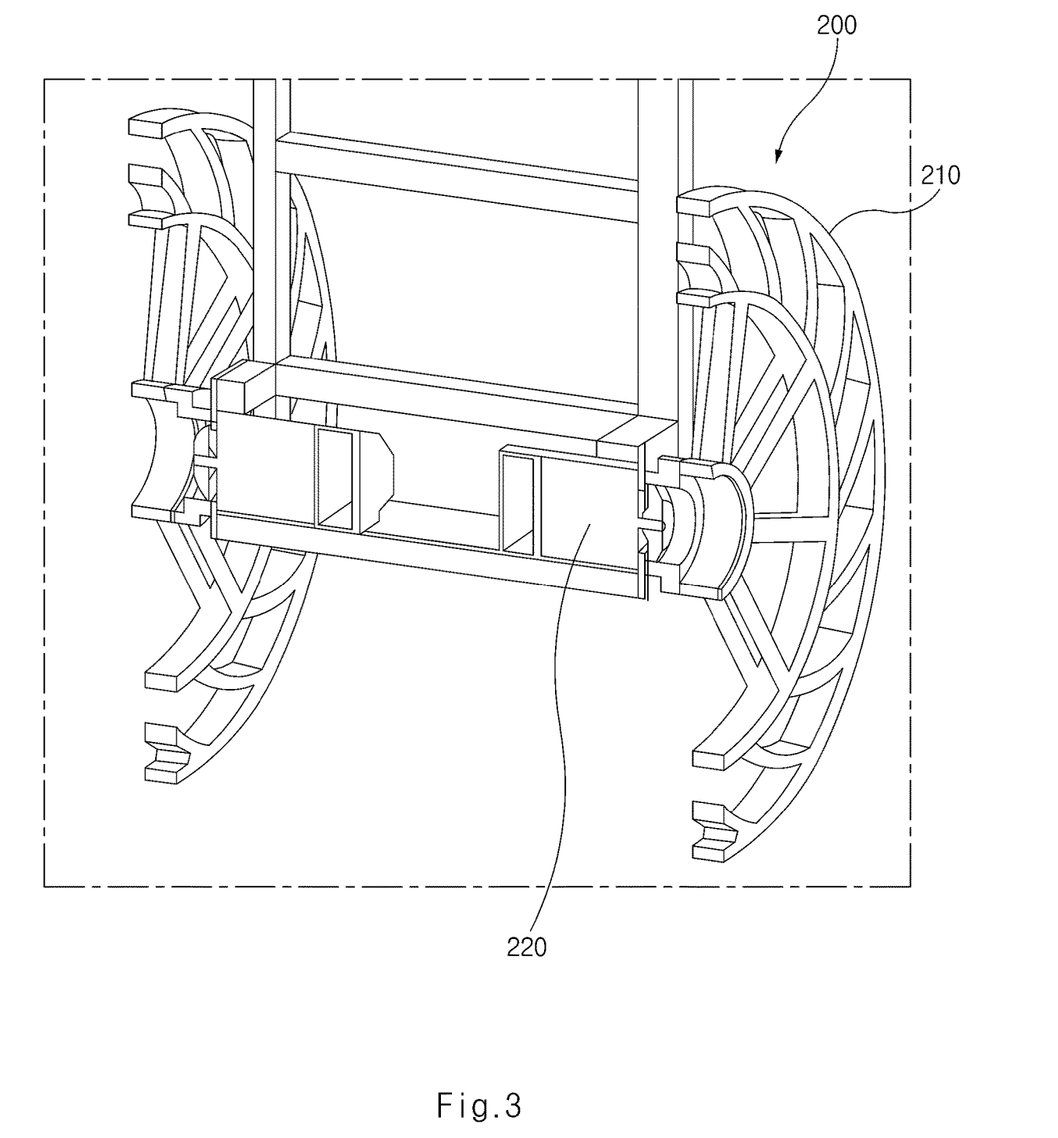
FIG. 3 is a cross-sectional view illustrating an enlarged structure of the drive part of the mobile object according to the present disclosure.
Figure 4:
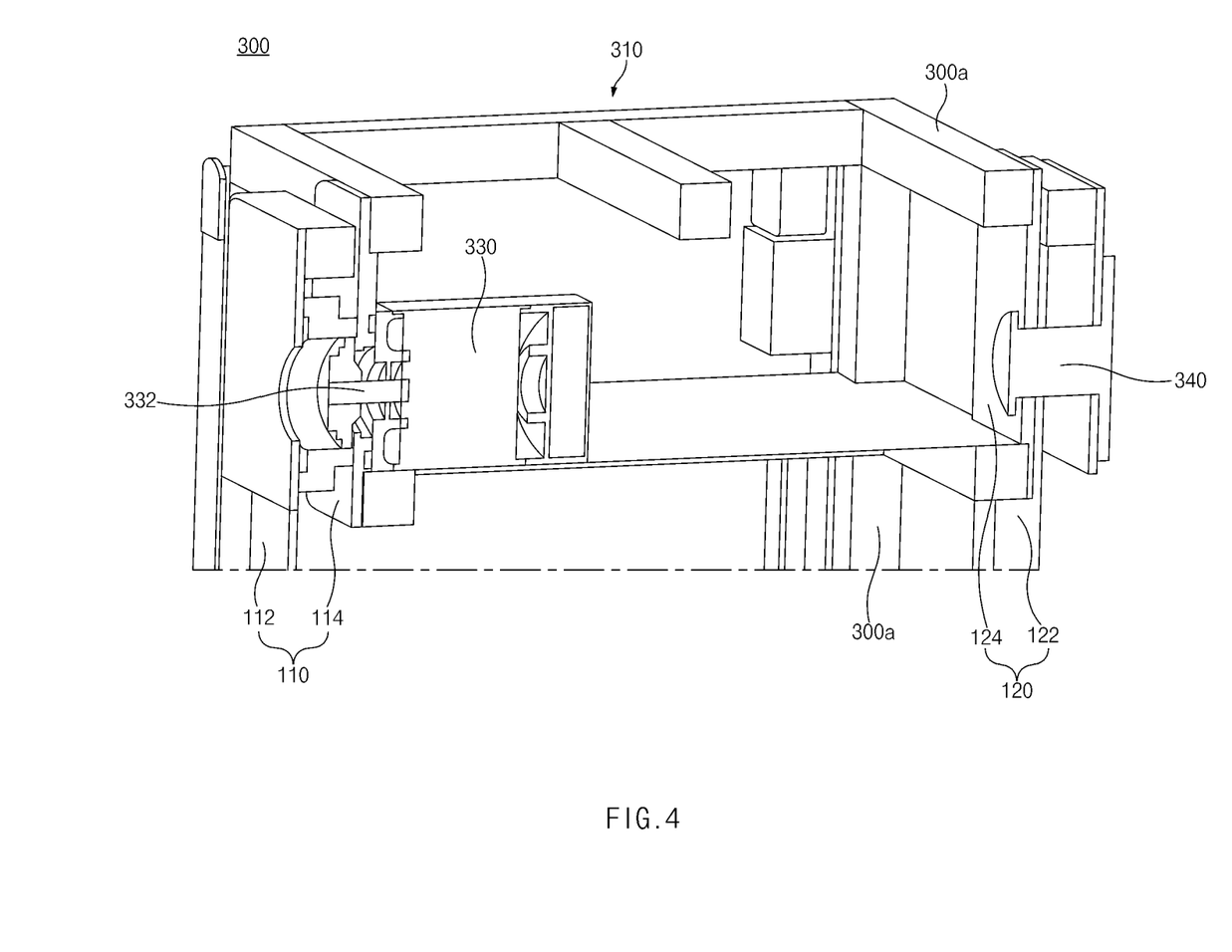
FIG. 4 is a cross-sectional view illustrating an enlarged upper structure of the accommodation part of the mobile object according to the present disclosure.

Hereinafter, a mobile object and a method of controlling the same according to the present disclosure will be described with reference to the drawings.
Mobile Object FIG. 1 is a perspective view illustrating a structure of a mobile object according to the present disclosure, and FIG. 2 is an exploded perspective view illustrating a body part, a drive part, and an accommodation part of the mobile object according to the present disclosure. In addition, FIG. 3 is a cross-sectional view illustrating an enlarged structure of the drive part of the mobile object according to the present disclosure, and FIG. 4 is a cross-sectional view illustrating an enlarged upper structure of the accommodation part of the mobile object according to the present disclosure.

A mobile object 10 according to the present disclosure may be an unmanned delivery robot capable of delivering an article.

Referring to FIGS. 1 to 4, a mobile object 10 according to the present disclosure may include a body part 100 configured to define a body of the mobile object 10, and a drive part 200 connected to one side of the body part 100 and including one or more wheels 210 and a drive motor 220 configured to operate the wheel 210. In further detail of the drive part 200, particularly, the wheel 210 may be coupled to a lower region of the body part 100. For example, as illustrated in the drawings, the drive part 200 may include two wheels 210. However, the number of wheels provided in the drive part 200 is not limited by the contents illustrated in the drawings, and more wheels may be present in other embodiments.

In addition, the mobile object 10 may include an accommodation part 300 coupled to the other side of the body part 100 and having an internal space S capable of accommodating an article. In further detail, the accommodation part 300 may be coupled to an upper region of the body part 100.

The drive part 200 of the mobile object 10 according to the present disclosure may be coupled to the lower region of the body part 100. The body part 100 may be rotatable relative to the drive part 200. The accommodation part 300 may be coupled to the upper region of the body part 100. The accommodation part 300 may be rotatable relative to the body part 100. More particularly, the body part 100 may be coupled to be rotatable in a forward or rearward direction relative to the drive part 200, and the accommodation part 300 may be coupled to be rotatable in the forward/rearward direction relative to the body part 100.

According to the present disclosure, i) the rotational motion of the body part 100 relative to the drive part 200 and ii) the rotational motion of the accommodation part 300 relative to the body part 100 are independently performed. Therefore, when the mobile object 10 encounters an obstacle, a center of gravity of the mobile object 10 may be quickly moved, such that the mobile object 10 may easily pass over the obstacle. A process in which the mobile object 10 according to the present disclosure passes over the obstacle will be described below.

Meanwhile, as illustrated in FIGS. 1 to 4, the accommodation part 300 may include a frame 310 including a plurality of rod members 300a coupled to one another to define an internal space S, and a battery 320 fixed to a lower region of the frame 310. More particularly, according to the present disclosure, the battery 320 may be fixedly coupled to the bottom surface of the frame 310 so that a center of gravity of the accommodation part 300 is further lowered.

As described above, according to the present disclosure, the accommodation part 300 may rotate relative to the body part 100. Therefore, the center of gravity of the mobile object 10 may be moved in the forward/rearward direction by the rotational motion of the accommodation part 300. In this case, when the battery 320 is disposed on the lower region of the frame 310, the battery 320 is positioned below the center of gravity of the accommodation part 300. Therefore, it is possible to maximize the movement of the center of gravity of the mobile object 10 in accordance with the rotational motion of the accommodation part 300. For example, the battery 320 may be configured to provide power to the drive part 200 and the accommodation part 300 provided in the mobile object 10 according to the present disclosure.

Continuing to refer to FIGS. 1 to 4, the body part 100 may include a first region 110 configured to define one side region of the body part 100 and rotatably coupled to the wheel 210 and the frame 310, and a second region 120 configured to define the other side region of the body part 100 and rotatably coupled to the wheel 210 and the frame 310.

In this case, the first region 110 may include a first frame 112 including rod members 100a extending in a vertical direction, and a first plate 114 coupled to a lateral side of an upper region of the first frame 112.

In addition, the second region 120 may include a second frame 122 including rod members 100a extending in the vertical direction, and a second plate 124 coupled to a lateral side of an upper region of the second frame 122.

In this case, the accommodation part 300 may include a first rotary shaft 332 configured to penetrate the first plate 114 and provided to be rotatable relative to the first plate 114, and a rotary motor 330 configured to operate the first rotary shaft 332. Therefore, according to the present disclosure, the first rotary shaft 332 may be rotated relative to the first plate 114 by the operation of the rotary motor 330.

Therefore, the rotational motion of the accommodation part 300 relative to the body part 100 may be implemented.

Meanwhile, when the accommodation part 300 is rotated relative to the body part 100 by the operation of the rotary motor 330, a second rotary shaft 340 needs to be rotated along with the rotation of the first rotary shaft 332. To this end, the accommodation part 300 may further include the second rotary shaft 340 configured to penetrate the second plate 124 and provided to be rotatable relative to the second plate 124. Unlike the first rotary shaft 332, the second rotary shaft 340 may not be rotated by a separate power but instead is rotated passively by the rotation of the first rotary shaft 332. Meanwhile, bearing members may be additionally provided between the first rotary shaft 332 and the first plate 114 and between the second rotary shaft 340 and the second plate 124.

Method of Controlling Mobile Object

Figure 5:
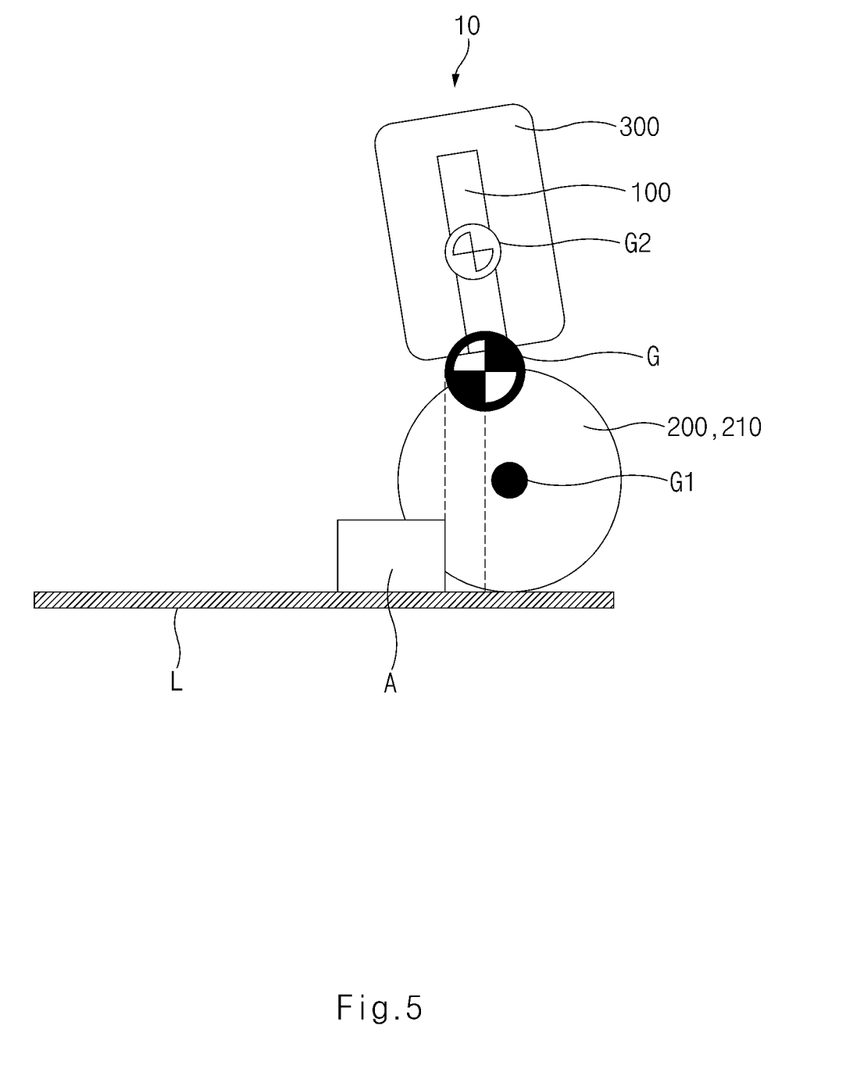
FIG. 5 is a view illustrating an example in which the mobile object according to the present disclosure climbs over an obstacle on a ground surface.
Figure 6:
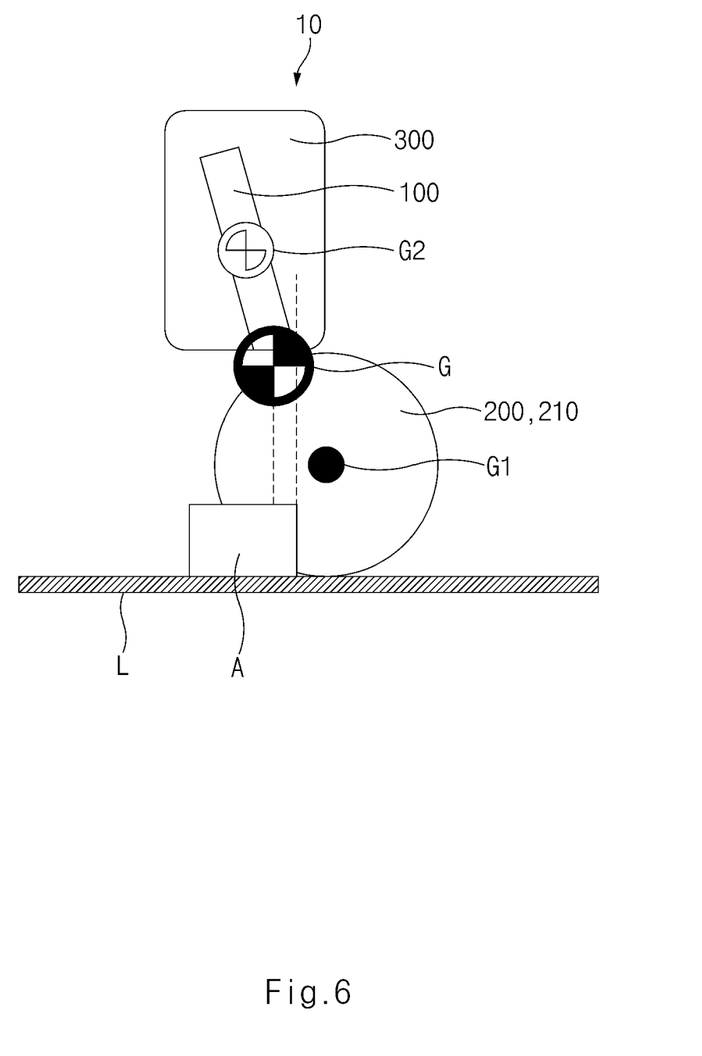
FIG. 6 is a view illustrating an example in which the mobile object according to the present disclosure climbs over an obstacle on a ground surface.

FIGS. 5 and 6 are views illustrating an example in which the mobile object according to the present disclosure climbs over an obstacle on a ground surface.

Referring to FIGS. 5 and 6, a first example of the method of controlling the mobile object 10 according to the present disclosure allows the mobile object 10 to pass an obstacle A when the mobile object 10 encounters the obstacle A on a ground surface L while the mobile object 10 moves.

In further detail, referring to FIGS. 1 to 6, the first example of the method of controlling the mobile object 10 according to the present disclosure may include a first-1 step in which the drive part 200, i.e., the wheel 210 is positioned at a front side of the mobile object 10 and faces the obstacle A protruding from the ground surface L, a first-2 step in which the body part 100 rotates forward relative to the drive part 200 and the body part 100 tilts forward, a first-3 step in which the rotary motor 330 operates and rotates the first rotary shaft 332 and the accommodation part 300 rotates relative to the body part 100 in a direction in which the accommodation part 300 moves forward, and a first-4 step in which the wheel 210 of the drive part 200 rotates and the mobile object 10 moves forward and passes the obstacle A. For example, the first-2 step and the first-3 step may at least partially overlap each other in a time series manner. Alternatively, the first-2 step and the first-3 step may be separated from each other in a time series manner.

In further detail, in the first-1 step, the wheel 210 of the drive part 200 may come into contact with the obstacle A. In the first-3 step, the accommodation part 300 may rotate relative to the body part 100 so that a center of gravity G of the mobile object 10 is positioned forward from a region in which the wheel 210 is in contact with the obstacle A. More particularly, before the first-3 step, the center of gravity G of the mobile object 10 may be positioned rearward from the region in which the wheel 210 is in contact with the obstacle A. After the first-3 step, the center of gravity G of the mobile object 10 may be positioned forward from the region in which the wheel 210 is in contact with the obstacle A.

The description will be made with reference to the above-mentioned contents. In the first-2 step, the body part 100 tilts forward to allow the mobile object 10 to easily pass the obstacle A by moving a center of gravity G2 of the accommodation part 300 forward in a state in which a center of gravity G1 of the drive part 200 is fixed.

Meanwhile, to allow the mobile object 10 to easily pass the obstacle A, the center of gravity G of the mobile object needs to be positioned forward from the region in which the mobile object 10 is in contact with the obstacle A. In this case, if the accommodation part 300 does not rotate relative to the body part 100, the body part 100 needs to tilt forward greatly to move the center of gravity of the mobile object 10 forward.

However, according to the present disclosure, since the accommodation part 300 may rotate relative to the body part 100, the accommodation part 300 may rotate forward in the first-3 step. Therefore, in the first-2 step, the center of gravity G of the mobile object 10 may be effectively moved forward even though the body part 100 tilts forward to a relatively low degree. The forward rotational motion of the accommodation part 300 relative to the body part 100 may be understood as being similar to the motion of the inverted pendulum.

In particular, according to the present disclosure described above, since the battery 320 provided in the accommodation part 300 is fixed to the bottom surface of the frame 310, the center of gravity G2 of the accommodation part 300 may be disposed at a relatively lower side. Therefore, a distance between the first rotary shaft 332 and the center of gravity G of the accommodation part 300 may be maximized, and thus the movement amount of the center of gravity G2 of the accommodation part 300 in accordance with the rotation of the first rotary shaft 332 may also be maximized.

Meanwhile, in the first-3 step of the first example of the method of controlling the mobile object 10 according to the present disclosure, the accommodation part 300 may rotate relative to the body part 100 so that the accommodation part 300 is perpendicular to the gravitational direction. In this case, it is possible to prevent a problem that the article stored in the internal space of the accommodation part 300 is lopsided to one side during the process in which the mobile object 10 passes the obstacle A.

Meanwhile, a second example of the method of controlling the mobile object 10 according to the present disclosure may include a second-1 step in which the drive part 200 is positioned at the front side of the mobile object 10 and faces the obstacle A protruding from the ground surface L, a second-2 step in which the body part 100 rotate relative to the drive part 200 and the body part 100 tilts forward, a second-3 step in which the wheel 210 of the drive part 200 rotates and the mobile object 10 moves forward, and a second-4 step in which the accommodation part 300 rotates relative to the body part 100 in a direction in which the accommodation part 300 moves rearward which is opposite to the forward direction. For example, the second-2 step, the second-3 step, and the second-4 step may at least partially overlap one another in a time series manner. Alternatively, the second-2 step, the second-3 step, and the second-4 step may be simultaneously performed.

The second example of the method of controlling the mobile object 10 according to the present disclosure minimizes a magnitude of net force applied to the article accommodated in the internal space of the accommodation part 300 when the mobile object 10 passes the obstacle A, thereby minimizing acceleration of the article. That is, in the second-2 step and the second-3 step, a force is applied to the accommodation part 300 forward. In contrast, in the second-4 step, a force is applied to the accommodation part 300. Therefore, a magnitude of net force applied to the accommodation part 300 and the article may decrease.

Meanwhile, the second example of the method of controlling the mobile object 10 according to the present disclosure may further include a second-5 step in which the accommodation part 300 rotates relative to the body part 100 in the direction in which the accommodation part 300 moves forward after the second-4 step. The second-5 step is performed to compensate for the rearward tilting of the accommodation part 300 in the second-4 step.

In addition, in the second example of the method of controlling the mobile object 10 according to the present disclosure, like the first-3 step of the first example, the accommodation part 300 may rotate relative to the body part 100 so that the accommodation part 300 is perpendicular to the gravitational direction in the second-5 step.

Meanwhile, a third example of the method of controlling the mobile object 10 according to the present disclosure is provided to accelerate the mobile object 10.

In further detail, the third example of the method of controlling the mobile object 10 according to the present disclosure may include an acceleration step of accelerating the mobile object 10. In this case, in the acceleration step, i) a rotational speed of the wheel 210 of the drive part 200 may increase, and ii) the accommodation part 300 may rotate relative to the body part 100 in a direction in which the mobile object 10 moves.

According to the third example, since the accommodation part 300 rotates in the forward direction in which the mobile object 10 moves, the center of gravity G2 of the accommodation part 300 moves forward. Therefore, the mobile object 10 may be more quickly accelerated, and a distance required to accelerate the mobile object 10 may be reduced.

Meanwhile, a fourth example of the method of controlling the mobile object 10 according to the present disclosure is provided to decelerate the mobile object 10.

In further detail, the fourth example of the method of controlling the mobile object 10 according to the present disclosure may include a deceleration step of decelerating the mobile object 10. In this case, in the deceleration step, i) a rotational speed of the wheel 210 of the drive part 200 may decrease, and ii) the accommodation part 300 may rotate relative to the body part 100 in a direction opposite to the direction in which the mobile object 10 moves.

According to the fourth example, since the accommodation part 300 rotates in the rearward direction opposite to the forward direction in which the mobile object 10 moves, the center of gravity G2 of the accommodation part 300 moves rearward. Therefore, the mobile object 10 may be more quickly decelerated, and a distance required to decelerate the mobile object 10 may be reduced.

The present disclosure has been described with reference to the limited embodiments and the drawings, but the present disclosure is not limited thereto. The present disclosure may be carried out in various forms by those skilled in the art to which the present disclosure pertains within the technical spirit of the present disclosure and within the scope equivalent to the appended claims.

What is claimed is:
1. A mobile object comprising:
    a body part;
    a drive part coupled to one side of the body part and comprising one or more wheels; and
    an accommodation part coupled to another side of the body part and having an internal space capable of accommodating an article,
    wherein the drive part is coupled to a lower region of the body part, and the body part is rotatably coupled to the drive part,
    wherein the accommodation part is coupled to an upper region of the body part, and the accommodation part is rotatably coupled to the body part,
    wherein the accommodation part comprises:
    a frame comprising a plurality of rod members fixedly coupled to one another to define the internal space;
    wherein the body part comprises:
    a first region configured to define one side region of the body part and rotatably coupled to the wheel and the frame; and
    a second region configured to define another side region of the body part and rotatably coupled to the wheel and the frame,
    wherein the first region comprises:
    a first frame comprising a rod member extending in a vertical direction; and
    a first plate coupled to a lateral side of an upper region of the first frame, and
    wherein the second region comprises:
    a second frame comprising a rod member extending in the vertical direction; and
    a second plate coupled to a lateral side of an upper region of the second frame,
    wherein the accommodation part further comprises:
    a first rotary shaft configured to penetrate the first plate and provided to be rotatable relative to the first plate;
    a rotary motor configured to operate the first rotary shaft, and
    a second rotary shaft configured to penetrate the second plate and provided to be rotatable relative to the second plate,
    wherein the second rotary shaft rotates passively by the rotation of the first shaft by the operation of the rotary motor.

2. The mobile object of claim 1, wherein the accommodation part further comprises:
    a battery fixed to a lower region of the frame.

3. The mobile object of claim 2, wherein the battery is fixed to a bottom surface of the frame.

4. A method of controlling the mobile object of claim 1, the method comprising:
    a first-1 step in which the drive part is positioned at a front side of the mobile object and faces an obstacle protruding from a ground surface;
    a first-2 step in which the body part rotates relative to the drive part and the body part tilts forward;
    a first-3 step in which the accommodation part rotates relative to the body part in a direction in which the accommodation part moves forward; and
    a first-4 step in which the wheel of the drive part rotates and the mobile object moves forward.

5. The method of claim 4, wherein in the first-1 step, the wheel of the drive part comes into contact with the obstacle, and
    wherein in the first-3 step, the accommodation part rotates relative to the body part so that a center of gravity of the mobile object is positioned forward from a region in which the wheel is in contact with the obstacle.

6. The method of claim 4, wherein in the first-3 step, the accommodation part rotates relative to the body part so that the accommodation part is perpendicular to a gravitational direction.

7. A method of controlling the mobile object of claim 1, the method comprising:
    a second-1 step in which the drive part is positioned at a front side of the mobile object and faces an obstacle protruding from a ground surface;
    a second-2 step in which the body part rotates relative to the drive part and the body part tilts forward;
    a second-3 step in which the wheel of the drive part rotates and the mobile object moves forward; and
    a second-4 step in which the accommodation part rotates relative to the body part in a direction in which the accommodation part moves rearward which is opposite to the forward direction.

8. The method of claim 7, further comprising:
a second-5 step in which the accommodation part rotates relative to the body part in a direction in which the accommodation part moves forward after the second-4 step.

9. The method of claim 8, wherein in the second-5 step, the accommodation part rotates relative to the body part so that the accommodation part is perpendicular to a gravitational direction.

* * * * *